March 6, 1962 W. L. LIPSCOMB 3,024,355
CURVED, CELLULAR LIGHT CONTROL PANEL
Filed Dec. 7, 1959 2 Sheets-Sheet 1
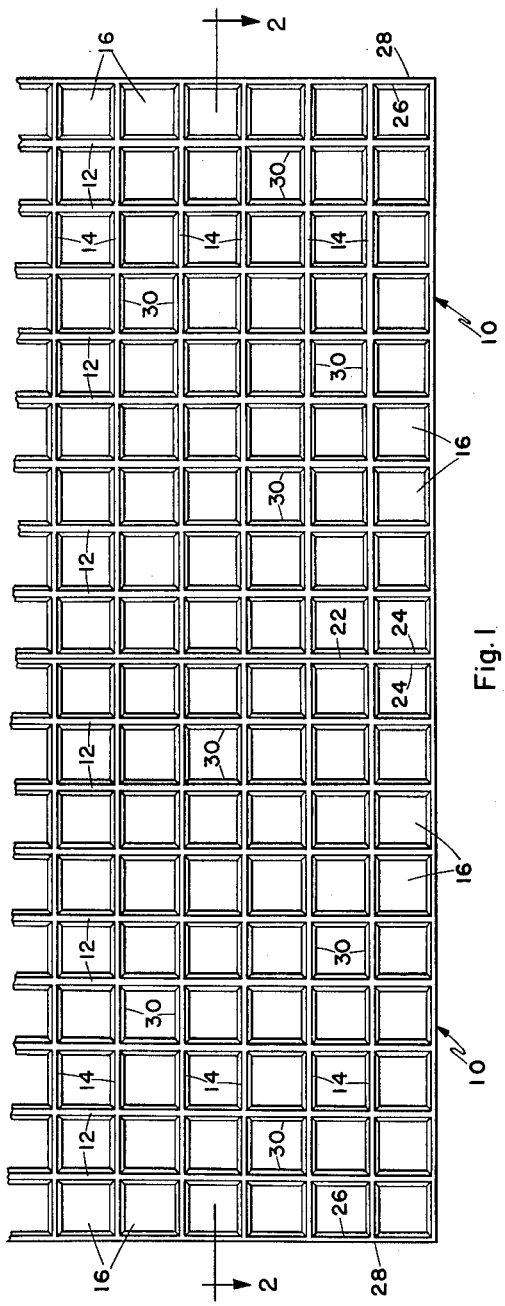
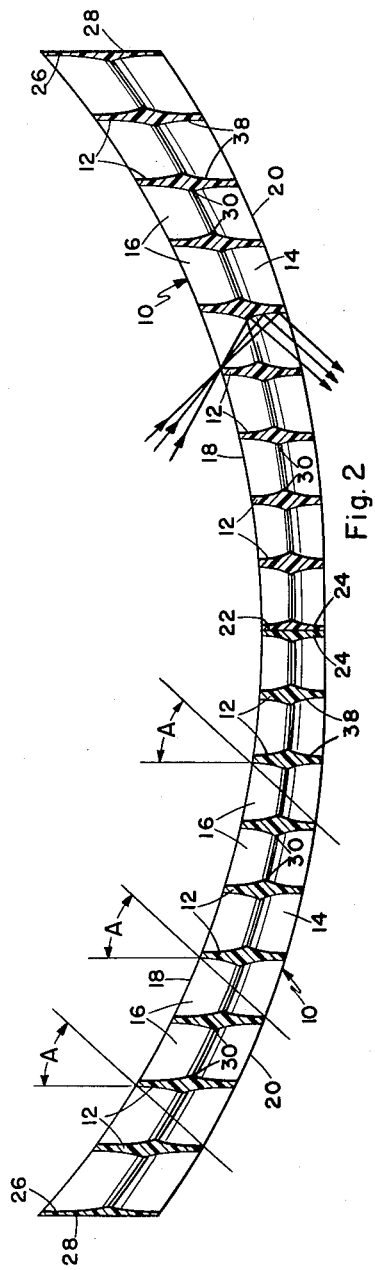
INVENTOR.
WILLIS L. LIPSCOMB
BY Knox & Knox March 6, 1962 W. L. LIPSCOMB 3,024,355
CURVED, CELLULAR LIGHT CONTROL PANEL
Filed Dec. 7, 1959
2 Sheets-Sheet 2
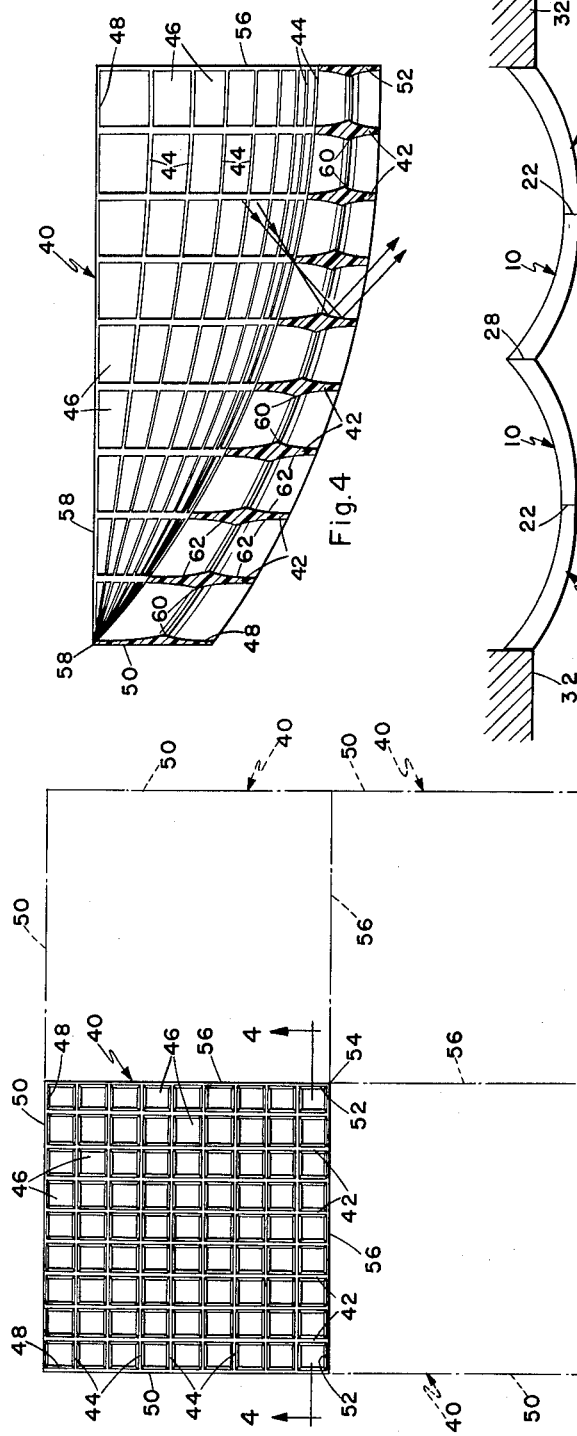
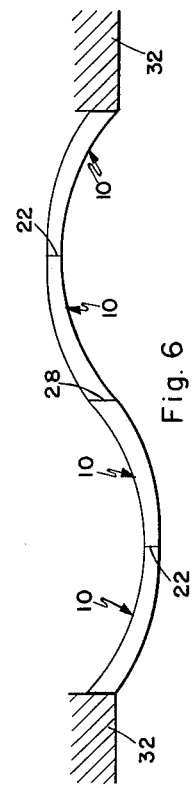
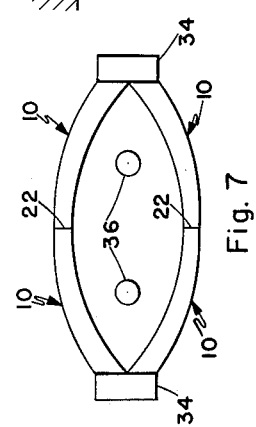
INVENTOR.
WILLIS L. LIPSCOMB
BY
Knox & Knox 3,024,355
CURVED, CELLULAR LIGHT CONTROL PANEL
Willis L. Lipscomb, San Diego, Calif.
Filed Dec. 7, 1959, Ser. No. 857,621
9 Claims. (Cl. 240—78)

The present invention relates generally to lighting equipment and more particularly to a cellular light control panel.

The primary object of this invention is to provide a cellular panel which is tapered in thickness in such a manner that the maximum angle of direct light distribution through the individual cells, that is, the shield angle, is constant throughout the panel.

Another object of this invention is to provide a curved cellular panel which can be made with curvature in one plane for linear panels, or may be curved in two planes for use in square units.

Another object of this invention is to provide a reversible cellular panel which is made in preformed units designed to be joined in edge to edge relationship to build up large panels in various novel configurations.

A further object of this invention is to provide a cellular panel which is suitable for use in ceiling or wall structures, or for mounting in conventional lighting fixtures.

Finally, it is an object to provide a cellular panel of the aforementioned character which is simple and convenient to make and which will give generally efficient and durable service with a minimum of maintenance.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a bottom plan view of one end of a linear type cellular panel composed of two units;

FIGURE 2 is a sectional view taken on the line 2—2 of FIGURE 1;

FIGURE 3 is a top plan view of one section of a square panel, the complete panel being indicated in broken outline;

FIGURE 4 is an enlarged sectional view taken on the line 4—4 of FIGURE 3; and

FIGURES 5, 6 and 7 are diagrammatic views showing various arrangements of the panels in multiple.

Similar characters of reference indicate similar or identical elements and portions throughout the specification and throughout the views of the drawings.

Referring now to FIGURES 1 and 2 of the drawings, the panel 10 comprises a first set of spaced, parallel walls, hereinafter arbitrarily termed first walls 12, and a second set of spaced, parallel walls, hereinafter arbitrarily termed transverse or second walls 14, intersecting the first walls substantially at right angles, the walls defining a plurality of cells 16 which are open at both ends. All of the walls 12 and 14 are perpendicular to a common plane, so that all of the cells 16 extend through the panel in a common direction. The walls 12 are of constant thickness. The transverse walls 14 are curved in one plane, each having a concave edge 18 and a convex edge 20. The convex edge 20 has a curvature which is shallower or of greater radius than that of the concave edge 18, so that the depth dimension of the transverse walls 14, measured in a plane parallel to the axes of the cells is graduated, that is, increases gradually from the inner or reduced face 22 to the outer or deeper face 28. The walls 12 correspond in depth to the transverse walls 14 at each intersection, thus the walls 12 are also graduated, that is, progressively wider deeper along with the increasing depth of the tapered transverse walls 14.

Each panel 10 is constructed with said inner or reduced depth face 22 as flat and substantially parallel to the axes of the cells 16, said reduced face being the exposed face of the corresponding reduced wall 24, interconnecting the narrow ends of the transverse walls 14. The wide ends of the transverse walls 14 are connected by an outer or deeper first wall 26 having a flat outer or deeper face 28, parallel to the inner or reduced face 22. In FIGURES 1 and 2, two panels 10 are joined together at the reduced faces 22 to form a single arcuate, composite panel, shallow at the center of the grouped panels and increasing in depth toward both outer edges of the composite panel, the flat faces 22 facilitating joining of the panels by adhesive or the like.

The curvature of the panel 10 is such that a diagonal of each cell 16 in the plane of curvature, from the upper edge of one wall 12 to the lower edge of the next adjacent, slightly deeper wall 12, extends at a constant angle to the axes of the cells 16, indicated at A in FIGURE 2. This angle is referred to herein as the shield angle or the maximum angle of direct light distribution in the plane of curvature and is substantially constant throughout the panel. Without the increase in depth of the panel, the shield angle A would increase toward the outer portion of the panel. In other words, the increase in depth of the cell walls toward the outside edges of the panel compensates for the curvature of the panel in preserving the required shielding. All of the walls 12 and 14 have thickened center portions 30 and taper toward their edges, this structure facilitating manufacture of the panels by plastic injection molding, increasing rigidity of the panel and providing a more decorative appearance than planar wall faces, as well as providing a very desirable brightness control as fully described and claimed in my application Serial No. 708,894, now abandoned, and Serial No. 630,622, and as explained hereinbelow.

The panel may be made in any width and length to suit various lighting fixtures or to fit modular building structures. Multiple panels may be assembled in various ways to build up large areas of cellular structure, one example being illustrated diagrammatically in FIGURE 5, in which four panels 10 are joined in pairs at their inner or reduced faces 22, the paired panels then being joined at confronting outer or deeper faces 28. The result illustrated is a composite wide panel of double arcuate cross section, which may be mounted between suitable support members 32, either in a ceiling or a wall. Due to their inherent rigidity, the panels 10 are adaptable to wall structures with the panels in upright position, providing light control and also ventilation if necessary. A further adaptation of multiple panels is illustrated in FIGURE 6, in which the panels 10 are joined in pairs, as in FIGURE 5, but one pair is reversed to form a composite panel generally serpentine in cross section.

Another arrangement, shown diagrammatically in FIGURE 7, utilizes two pairs of panels 10 mounted back-to-back with their concave faces inwardly to provide an enclosed cavity between the panels, which are held between support members 34. The structure may be used as a free standing wall unit or divider and can be internally illuminated by lamps 36 if desired. The various multiple panel arrangements are merely examples of the adaptability of the individual panel 10 different uses and many other arrangements will be evident to those skilled in the art. It is also noteworthy that a large number of panels 10 may be combined in larger composite panels for use in ceilings and walls.

The panel 10 provides control of direct light, with a constant shield angle, through the cells.

A slightly modified panel 40, illustrated in FIGURES 3 and 4 has compound curvature and provides controlled distribution of direct light in two directions normal to each other with corresponding shielding. The panel 40 is preferably square in outline and is illustrated as one quarter of a four unit composite panel, the other three units being indicated in broken line in FIGURE 3. The panel 40 has a set of spaced, parallel first walls 42 curved along their length in the plane of their depth, and a set of spaced, parallel second walls 44 also curved along their length in the plane of their depth and intersecting said first walls at right angles to define individual cells 46 therebetween. The outside of panel 40 is bounded by two outer walls 48 at right angles to each other, said outer walls being of constant depth, straight along their length and having flat outer faces 50. The inside of panel 40 is bounded by inner walls 52, curved along their length and tapering from the full depth of the outer walls 48 at their intersection therewith to a minimum depth at the intersection of the inner walls at the inner corner 54 of said panel, said inner walls having flat inner faces 56. As illustrated in FIGURE 4, with the upper edges 58 of outer walls 48 horizontal and coplanar, the inner walls 52 curve downwardly so that the inner corner of the panel is offset substantially below the outer walls, the walls 42 and 44 having a successively decreasing radius of curvature from the outer walls to the inner walls. Thus when four panels 40 are secured together at the inner faces 56, as in FIGURE 3, the result is a square, dished panel. As in the panel 10, the taper of the curved walls is such that the diagonal of each cell 46 is constant, providing a constant shield angle and control of direct light distribution through each cell. But in the panel 40, both sets of walls are curved, so that the shield angle is the same in two directions across the panel. All of the walls 42, 44, 48 and 52 have thickened center portions 60 and, as in the panel 10, all of the walls are perpendicular to a common plane. An important feature of this invention will now be evident. The panels are reversible, the walls 12 and 42 being tapered in thickness toward each face of the panel. As illustrated, the taper is generated by parabolically curved surfaces 38 and 62 but the word "taper" is herein employed in its widest sense. All light from above the panel is either shielded at the desired angle, directly passed through the panel, or reflected a minimum number of times. Virtually all the light first falling on those surfaces 38 and 62 remote from the source of light will be reflected only once as indicated in FIGURES 2 and 4 and this minimum reflectance results in increased lighting efficiency while the desired brightness control is maintained.

The panel 40 may be constructed in any size with any number of walls, although it is convenient to make the size to fit modular dimensions of building structures, in order that the panels may be built in as integral units if desired. The panels may be assembled in various arrangements, such as illustrated in FIGURES 5–7, to provide dished or domed units as needed.

The panels are preferably molded from translucent plastic material to provide an overall soft, diffused light, together with control of the angle of dispersion of direct light and shielding in one or two directions, according to whether the panel 10 or the panel 40 is used and because of the flat peripheral faces 28 and 50, the panels may be cemented or bonded together in various multiples and combinations.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A cellular light control panel, comprising: a set of spaced, parallel first walls, and another set of spaced, parallel second walls intersecting the walls of said first set of walls at right angles and defining a plurality of open ended cells therebetween; all of said walls being perpendicular to a common plane; said first and second walls being equal in depth at each intersection thereof; and at least one of said sets of walls being curved in a plane perpendicular to said common plane and of graduated depth; the diagonal of each cell in said plane of curvature from the upper edge of one wall of the cell to the lower edge of the next adjacent slightly deeper wall extending at a constant angle to the axes of the cells so that the shield angle between the axes of the cells and said diagonals in the plane of curvature is constant, whereby the desired degree of brightness control is achieved.

2. A cellular light control panel, comprising: a set of spaced, parallel first walls, and another set of spaced, parallel second walls intersecting the walls of said first set of walls at right angles and defining a plurality of open ended cells therebetween; all of said walls being perpendicular to a common plane; at least one of said sets of walls being curved in a plane perpendicular to said common plane and being of graduated depth; the diagonal of each cell in the plane of curvature from the upper edge of one wall of the cell to the lower edge of the next adjacent slightly deeper wall extending at a constant angle to the axes of the cells; so that the shield angle between the axes of the cells and said diagonals in the plane of curvature is constant; said first and second walls being equal in depth at each intersection thereof; the face of said panel at the edge thereof of greatest depth being flat and perpendicular to said common plane to facilitate the edge abutment of like or inverted light control panels.

3. A cellular light control panel, comprising: a set of spaced, parallel first walls, and another set of spaced, parallel second walls intersecting the walls of said first set of walls at right angles and defining a plurality of open ended cells therebetween; said second walls being curved in the plane of their depth and each having one concave edge and one convex edge said second walls being graduated in depth; said first and second walls being equal in depth at each intersection thereof; and the diagonal of each cell in said plane of curvature from the upper edge of one wall of the cell to the lower edge of the next adjacent slightly deeper wall extending at a constant angle to the axes of the cells so that the shield angle between the axes of the cells and said diagonals are constant.

4. A cellular light control panel, comprising: a set of spaced, parallel first walls, and another set of spaced, parallel second walls intersecting the walls of said first set of walls at right angles and defining a plurality of open ended cells therebetween; all of said walls being perpendicular to said common plane; said second walls being curved in the plane of their depth and each having one concave edge and one convex edge; said convex edges each having a substantially greater radius of curvature than said concave edges, said second walls being graduated in depth; said first and second walls being equal in depth at each intersection thereof; and the diagonal of each cell in said plane of curvature from the upper edge of one wall of the cell to the lower edge of the next adjacent slightly deeper wall extending at a constant angle to the axes of the cells so that the shield angle between the axes of the cells and said diagonals are constant.

5. A cellular light control panel according to claim 1, wherein each of said walls has a thickened central portion intermediate the depth thereof.

6. A cellular light control panel, comprising: a set of spaced, parallel first walls, and another set of spaced, parallel second walls intersecting the walls of said first set of walls at right angles and defining a plurality of open ended cells therebetween; all of said walls being perpendicular to a common plane; said first and second walls each being curved in planes perpendicular to said common plane and being graduated in depth; said first and second walls being equal in depth at each intersection thereof; and the graduation of said walls being such that the diagonal of each cell in said planes of curvature from the upper edge of one wall of the cell to the lower edge of the next adjacent slightly deeper wall extend at a constant angle to the axes of the cells so that shield angles in the planes of curvature are constant.

7. A cellular light control panel, comprising: a set of spaced, parallel first walls, and another set of spaced, parallel second walls intersecting the walls of said first set of walls at right angles and defining a plurality of open ended cells therebetween; all of said walls being perpendicular to a common plane; said panel being generally square and bounded on two adjacent sides by outer walls of constant depth; said first and second walls being curved in a plane perpendicular to said common plane and being graduated in depth inwardly from said outer walls; the other two adjacent sides of said panel being bounded by curved, graduated depth inner walls intersecting at an inner corner substantially offset from said outer walls in a direction normal to said common plane; all of said walls being equal in depth at each intersection thereof; and the graduation of said first and second walls being such that the diagonal of each cell in said plane of curvature from the upper edge of one wall of the cell to the lower edge of the next adjacent slightly deeper wall extends at a constant angle to the axes of the cells so that the shielding angle in the planes of curvature is constant.

8. A cellular light control panel according to claim 7, wherein the outer faces of said outer walls and the corresponding faces of said inner walls are flat and perpendicular to said common plane.

9. A cellular light control panel, comprising: a set of spaced, parallel first walls, and another set of spaced, parallel second walls intersecting the walls of said first set of walls at right angles and defining a plurality of open ended cells therebetween; said first and second walls being equal in depth at each intersection thereof; and at least one of said sets of walls being graduated and having the depth of the walls increasing toward both pairs of opposite edges of the panel so that the shield angle is constant throughout the panel and the panel is reversible the diagonal of each cell in its respective plane of curvature from the upper edge of one wall of a cell to the lower edge of the next adjacent slightly deeper wall extending at a constant angle to the axes of the cells.

References Cited in the file of this patent

UNITED STATES PATENTS

| 2,431,656 | Barker | Nov. 25, 1947 |
| 2,830,174 | Gagnier | Apr. 8, 1958 |
| 2,837,632 | Lipscomb | June 3, 1958 |
| 2,904,673 | Guth | Sept. 15, 1959 |
| 2,937,265 | Blitzer | May 17, 1960 |
| 2,971,083 | Phillips et al. | Feb. 7, 1961 |

FOREIGN PATENTS

| 862,697 | France | Dec. 16, 1940 |
| 864,836 | Germany | Jan. 29, 1953 |
| 62,517 | France | Jan. 26, 1955 |
| | (First addition to No. 1,040,272) | |